(12) United States Patent
Sinha et al.

(10) Patent No.: US 9,341,481 B2
(45) Date of Patent: May 17, 2016

(54) METHOD AND SYSTEM FOR PROVIDING TOURIST ASSISTANCE AND GUIDED NAVIGATION BY METADATA TRANSMISSION

(71) Applicants: Aniruddha Sinha, Kolkata (IN); Dhiman Chattopadhyay, Kolkata (IN)

(72) Inventors: Aniruddha Sinha, Kolkata (IN); Dhiman Chattopadhyay, Kolkata (IN)

(73) Assignee: Tata Consultancy Services Limited (IN)

( * ) Notice: Subject to any disclaimer, the term of this patent is extended or adjusted under 35 U.S.C. 154(b) by 63 days.

(21) Appl. No.: 14/361,796

(22) PCT Filed: Nov. 27, 2012

(86) PCT No.: PCT/IN2012/000773
§ 371 (c)(1),
(2) Date: May 30, 2014

(87) PCT Pub. No.: WO2013/102924
PCT Pub. Date: Jul. 11, 2013

(65) Prior Publication Data
US 2014/0379259 A1 Dec. 25, 2014

(30) Foreign Application Priority Data
Nov. 30, 2011 (IN) .......................... 3367/MUM/2011

(51) Int. Cl.
| | | |
|---|---|---|
| *G01C 21/00* | (2006.01) |
| *G06Q 30/02* | (2012.01) |
| *G06Q 50/00* | (2012.01) |
| *G06Q 50/10* | (2012.01) |
| *H04W 4/02* | (2009.01) |
| *H04W 4/20* | (2009.01) |
| *H04M 3/42* | (2006.01) |
| *H04M 3/487* | (2006.01) |
| *H04L 29/08* | (2006.01) |

(52) U.S. Cl.
CPC ............ *G01C 21/00* (2013.01); *G06Q 30/0207* (2013.01); *G06Q 50/01* (2013.01); *G06Q 50/10* (2013.01); *H04L 67/2804* (2013.01); *H04L 67/2895* (2013.01); *H04M 3/42348* (2013.01); *H04M 3/487* (2013.01); *H04M 2242/15* (2013.01); *H04W 4/02* (2013.01); *H04W 4/20* (2013.01)

(58) Field of Classification Search
CPC .............................. G01C 21/00; G01C 21/20
See application file for complete search history.

(56) References Cited

U.S. PATENT DOCUMENTS

| | | | |
|---|---|---|---|
| 2002/0091793 A1 | 7/2002 | Sagie | |
| 2005/0282576 A1* | 12/2005 | Delker | H04M 1/72569 455/550.1 |
| 2010/0153009 A1 | 6/2010 | Pelosio | |
| 2011/0098056 A1* | 4/2011 | Rhoads | G01C 21/20 455/456.1 |

OTHER PUBLICATIONS

International Search Report of PCT/IN2012/000773 dated Jun. 28, 2013 (2 pages).

* cited by examiner

*Primary Examiner* — Imran Mustafa
(74) *Attorney, Agent, or Firm* — Finnegan, Henderson, Farabow, Garrett & Dunner, LLP

(57) ABSTRACT

The application provides a method and system for providing tourist assistance and guided navigation of a tourist spot by transmitting metadata across a communication network. The application provides a method and system for utilizing a beyond audible frequency signal for metadata transmission across a communication network. The application provides a method and system for emitting an encoded metadata over the beyond audible frequency signal, receiving and parsing the said received encoded metadata, extracting and decoding barcode received along with encoded metadata and retrieving the tourist information by accessing a web link received along with encoded metadata for plurality of web based services.

12 Claims, 4 Drawing Sheets

METHOD AND SYSTEM FOR PROVIDING TOURIST ASSISTANCE AND GUIDED NAVIGATION BY METADATA TRANSMISSION

CROSS-REFERENCE TO RELATED PATENT APPLICATIONS

This application is a National Stage Entry under 35 U.S.C. §371 of International Application No. PCT/IN2012/000773, filed Nov. 27, 2012, which claims priority from Indian Patent Application No. 3367/MUM/2011, filed Nov. 30, 2011. The entire contents of the above-referenced applications are expressly incorporated herein by reference for all purposes.

FIELD OF THE APPLICATION

The present application relates to network communication and information transmission. Particularly, the application relates to a method and system for providing tourist assistance and guided navigation of a tourist spot by transmitting metadata across a communication network.

BACKGROUND OF THE INVENTION

'Information' has become an absolutely essential part of every human activity. Over the time several protocols have been developed that facilitate sharing of information with information tourists for different applications.

Public exposure of the useful information related to the any strategic location such as a tourist spot, not only helps the tourist to navigate properly through out the said location but also provides the general knowledge about the particular location. The strategic location may include but not limited to a tourist spot, a museum, an article in the museum, a fort, an amusement park or a conference venue.

In the current scenario, audio, visual or audio-visual display of information is the most common means for information dissemination in such tourist spot. Wherein the tourist is always dependent on limited information, played or displayed related to that particular strategic location. Since there is no such technical provision where the tourist is enabled to receive detailed metadata about the particular strategic location along with the associated web based information on their personal communication device.

Since, the information age today is well pillared on the considerably developed communication protocols. The metadata transmission over a particular communication network having subscribed by plurality of tourists have been proved to be the best known method for information dissemination in an environment described above.

The metadata specific frequency selection for transmitting the metadata over a particular communication network has been confronted as one of the major technological challenge.

The existing communication modes being used such as internet protocol (IP), Wi-Fi, Bluetooth, ZigBee etc. However, the said communication modes require a special hardware support and setup for an infrastructure.

Hence it becomes inevitable to formulate a method and system which shall transmit metadata related to the particular strategic location over the beyond audible frequency signal on tourist's personal communication devices. The transmitted metadata shall provide tourist assistance and guided navigation to the tourist through out the particular tourist spot and help increasing their knowledge about it.

Lots of efforts have been made to develop various approaches to attempt the said problem; most of the generic methods do not utilize specific frequency for metadata transmission. Most of the prior arts do not enable the tourists to access the metadata related to the particular tourist spot on their personal communication devices for guided navigation through out the particular tourist spot.

Thus it becomes extremely necessary to provide a method and system for providing tourist assistance and guided navigation of a tourist spot by transmitting metadata transmission across the communication network which can utilize the beyond audible frequency signal, as well as existing hardware setup of a mobile communication device.

However, the existing methods and systems particularly are not capable of providing a solution for tourist assistance and guided navigation of a tourist spot by transmitting metadata across the communication network over the beyond audible frequency signal. Some of above mentioned methods known to us are as follows:

U.S. Pat. No. 6,790,182 to Eck at al. teaches an ultrasound imaging system for imaging ultrasound scatterers, comprising a probe for transmitting ultrasound waves and detecting ultrasound echoes reflected by said ultrasound scatterers. The patent does not teach about metadata transmission across a communication network, over a beyond audible frequency signal.

U.S. Pat. No. 5,854,589 to How et al. teaches a magnetic/acoustic transducer, which can be used in security/smart tag applications. The patent does not teach about metadata transmission across a communication network, over a beyond audible frequency signal.

US20050171429 to Mathew et al. teaches a system and method for an improved image acquisition rate in an ultrasound imaging system. The patent application does not teach about metadata transmission across a communication network, over a beyond audible frequency signal.

WO2006119764 to Blaabjerg at al. teaches a system for determining the position of an object such as an array of measuring microphones relative to a fixed station of the system. The patent application does not teach about metadata transmission across a communication network, over a beyond audible frequency signal.

Filonenko et al. in "Investigating Ultrasonic Positioning on Mobile Phones" evaluates the innate ability of mobile phone speakers to produce ultrasound and the possible uses of this ability for accurate indoor positioning.

Simonite in "Bringing Cell-Phone Location-Sensing Indoors" teaches small beacons, fixed to a store's ceiling beam out an ultrasound signal at a frequency that can be picked up by a cell phone's microphone but not by human ears.

Richard et al. in "The Ultrasound Smartphone" teaches an ultrasound smartphone, coupled with a USB-based probe, enabling a compact, mobile computational platform and a medical imaging device that fits in the palm of a hand.

Mobisante Inc. in "Portable ultrasound scanner with a Smartphone" teaches a diagnostic for high-quality images at low cost based on the traditional ultrasound technology.

Suilivan in "Zoosh: An Alternative to Google Wallet & NFC" teaches Near Field Communication (NFC) using the simple speaker and microphone found in mobile devices.

The above mentioned prior arts fail to disclose an efficient method and system for metadata transmission across the communication network. The prior art also fail to disclose about a method and system which could utilize the beyond audible frequency signal as well as existing hardware setup of a mobile communication device for metadata transmission across a communication network for providing tourists with guided navigation.

Thus, in the light of the above mentioned background art, it is evident that, there is a long felt need for such a solution that can provide an effective method and system for providing tourist assistance and guided navigation of a tourist spot by transmitting metadata across the communication network over the beyond audible frequency signal utilizing existing hardware setup of a mobile communication device.

OBJECTIVES OF THE APPLICATION

The primary objective of the present application is to provide a method and system for providing tourist assistance and guided navigation of a tourist spot by transmitting metadata transmission across a communication network over a beyond audible frequency signal and could utilize existing hardware setup of a mobile communication device.

Another objective of the application is to enable a method and system for placement of beyond audible frequency signal emitters for metadata transmission, inside the tourist spot for providing tourist assistance and guided navigation.

Another objective of the application is to enable a method and system for emitting encoded metadata over a beyond audible frequency signal; received and parsed the said encoded metadata.

Another objective of the application is to enable a method and system for extracting and decoding barcode received along with the said encoded metadata.

Another objective of the application is to enable a method and system for retrieving the tourist's personal information related to travel such as itinerary etc. and additional information such as offers, discounts, queue-jump pass related to the tourist spot by accessing at least one web link received along with encoded metadata for plurality of web based services.

Another objective of the application is to enable a method and system for retrieving the tourist's personal information such as personal choices of the tourist about the area of interest, favorite cuisine etc. from social network of the tourist by the application running on tourist's communication device.

Yet another objective of the application is to enable a method and system for mashing up said retrieved tourist's personal information related to travel such as itinerary etc. with decoded barcode related information; rendering and displaying the said mashed up information on the tourist's communication device.

SUMMARY OF THE APPLICATION

Before the present methods, systems, and hardware enablement are described, it is to be understood that this application in not limited to the particular systems, and methodologies described, as there can be multiple possible embodiments of the present application which are not expressly illustrated in the present disclosure. It is also to be understood that the terminology used in the description is for the purpose of describing the particular versions or embodiments only, and is not intended to limit the scope of the present application which will be limited only by the appended claims.

The present application provides a method and system for providing tourist assistance and guided navigation of a tourist spot by transmitting metadata across a communication network over a beyond audible frequency signal and could utilize existing hardware setup of a mobile communication device.

In an aspect of the present invention, a beyond audible frequency signal emitters are employed to emit an encoded metadata over the beyond audible frequency signal. The said transmitted encoded metadata over the beyond audible frequency signal is received on a tourist's personal communication device. The said received encoded metadata is parsed for separating the received encoded metadata from audible range signal in order to extract the normal data embedded as metadata on beyond audible frequency signal.

In an aspect of the present invention, a barcode received along with encoded metadata is extracted and further decoded to extract the embedded information therein. The tourist's personal information related to travel such as itinerary etc. is retrieved by accessing at least one web link received along with encoded metadata for plurality of web based services.

In an aspect of the present invention, the said retrieved tourist's personal information such as personal choices of the tourist about the area of interest, favorite cuisine etc. from social network of the tourist by the application running on tourist's communication device, is mashed up with decoded barcode related information for rendering and displaying on the tourist's communication device. The invention also retrieves information from various websites and provides hyperlinks for further display on the tourist's personal communication device.

The above said method and system are preferably a method and system for providing tourist assistance and guided navigation of a tourist spot by transmitting metadata across a communication network over a beyond audible frequency signal but also can be used for many other applications, which may be obvious to a person skilled in the art.

BRIEF DESCRIPTION OF DRAWINGS

The foregoing summary, as well as the following detailed description of preferred embodiments, are better understood when read in conjunction with the appended drawings. For the purpose of illustrating the application, there is shown in the drawings exemplary constructions of the application; however, the application is not limited to the specific methods and system disclosed. In the drawings.

DETAILED DESCRIPTION OF THE APPLICATION

Figure 1:
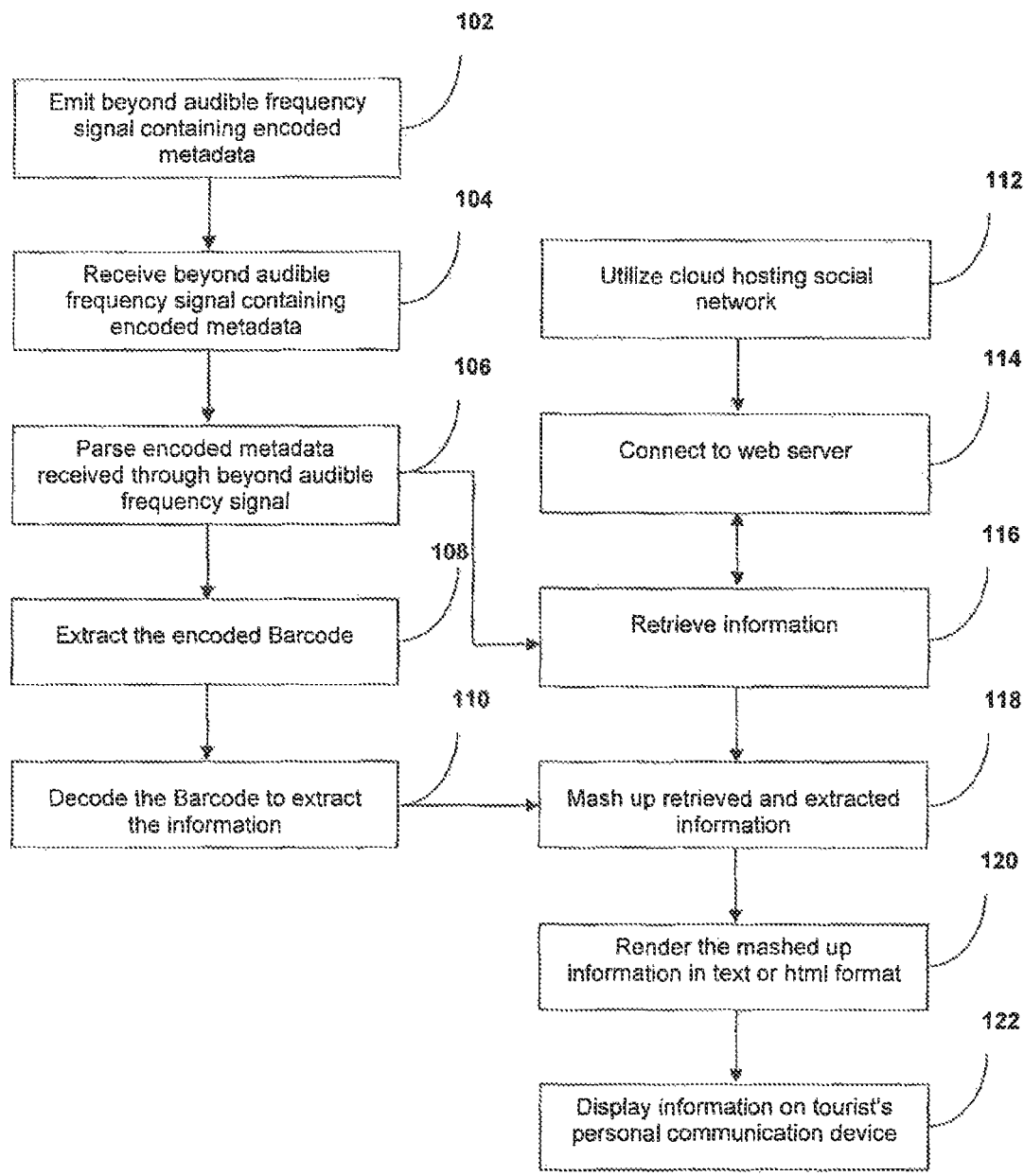
FIG. 1 shows flow diagram of the process for providing tourist assistance and guided navigation of a tourist spot by transmitting metadata across a communication network over a beyond audible frequency signal.

Some embodiments of this application, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present application, the preferred, systems and methods are now described.

The disclosed embodiments are merely exemplary of the application, which may be embodied in various forms. In the specification 'metadata' and 'information' are interchangeably used.

The present application provides a method for providing tourist assistance and guided navigation of a tourist spot, characterized by a metadata transmission across a communication network using beyond audible frequency signal and processing thereof, the said method comprising computer implemented steps of:
  a. emitting an encoded metadata over the beyond audible frequency signal using a beyond audible frequency signal emitter (202);
  b. receiving the said emitted beyond audible frequency signal along with the said encoded metadata on a tourist communication device (222) using a beyond audible frequency signal receiver (204);
  c. parsing the said received encoded metadata using metadata parser (206);
  d. extracting at least one barcode received along with encoded metadata using at least one barcode extractor (208) and decoding the extracted barcode received along with encoded metadata using barcode decoder (210);
  e. retrieving the tourist information from the received metadata and barcode information; and
  f. retrieving the additional detailed tourist spot related information by accessing at least one web link received along with encoded metadata for plurality of web based services using at least one information retrieval (212) module by accessing at least one cloud hosting social network (216) through at least one web server (214).

The present application provides a system for providing tourist assistance and guided navigation of a tourist spot, characterized in a metadata transmission across a communication network using beyond audible frequency signal and processing thereof, wherein the system comprising at least one beyond audible frequency signal emitter (202); at least one beyond audible frequency signal receiver (204); at least one metadata parser (206); at least one barcode extractor (208); at least one barcode decoder (210); at least one information retrieval (212) module; at least one web server (214); at least one cloud hosting social network (216); at least one information mash up (218) module; at least one page formatter (220); and at least one tourist's communication device (222); wherein the beyond audible frequency signal emitter (202) adapted to emit beyond audible frequency signals containing encoded metadata; the beyond audible frequency signal receiver (204) adapted to receive beyond audible frequency signals containing encoded metadata; the metadata parser (206) adapted to parse the received beyond audible frequency signals containing encoded metadata; the barcode extractor (206) adapted to extract an encoded barcode received along with encoded metadata; the barcode decoder (210) adapted to decode the encoded barcode received along with encoded metadata; the information retrieval (212) module adapted to retrieve information; the web server (214) adapted to host plurality of web services; the cloud hosting social network (216) containing the tourist's social interaction related information; the information mash up (218) module adapted to mash up the extracted normal information and information retrieved from the barcode; the page formatter (220) adapted to render the mashed up information; the tourist's communication device (222) having at least one display screen adapted to display the rendered mashed up information.

Referring to the FIG. 1 is a flow diagram of the process for providing tourist assistance and guided navigation of a tourist spot by transmitting metadata across a communication network over a beyond audible frequency signal.

The process starts at the step 102, a beyond audible frequency signals containing encoded metadata are emitted. At the step 104, the beyond audible frequency signals containing encoded metadata are received. At the step 106, the received encoded metadata through beyond audible frequency signals are parsed. At the step 108, the encoded Barcode received along with encoded metadata is extracted. At the step 110, the encoded Barcode received along with encoded metadata is decoded to extract the embedded information. At the step 112, a cloud hosting social network is utilized to extract tourist's personal interest areas. At the step 114, a web server is connected. As an alternative barcode information, may contain certain URL of webpage which can then be accessed from the web server. At the step 116, information is retrieved using the cloud hosting social network through the connected web sever. At the step 118, the retrieved and extracted information is mashed up. At the step 118, the mashed up information is rendered in text or html format. The process ends at the step 122; the rendered information is displayed on tourist's personal communication device.

Working Example the Invention

The present invention is a system and method for providing tourist assistance and guided navigation of a tourist spot by transmitting metadata across a communication network over a beyond audible frequency signal by utilizing existing hardware setup of a mobile communication device. More particularly, the present invention provides system and method for placement of beyond audible frequency signal emitters inside the tourist spot for providing tourist assistance and guided navigation. The tourist spot may include the tourist attractions, conference venue, museum, art pieces, forts or amusement parks.

Figure 2:
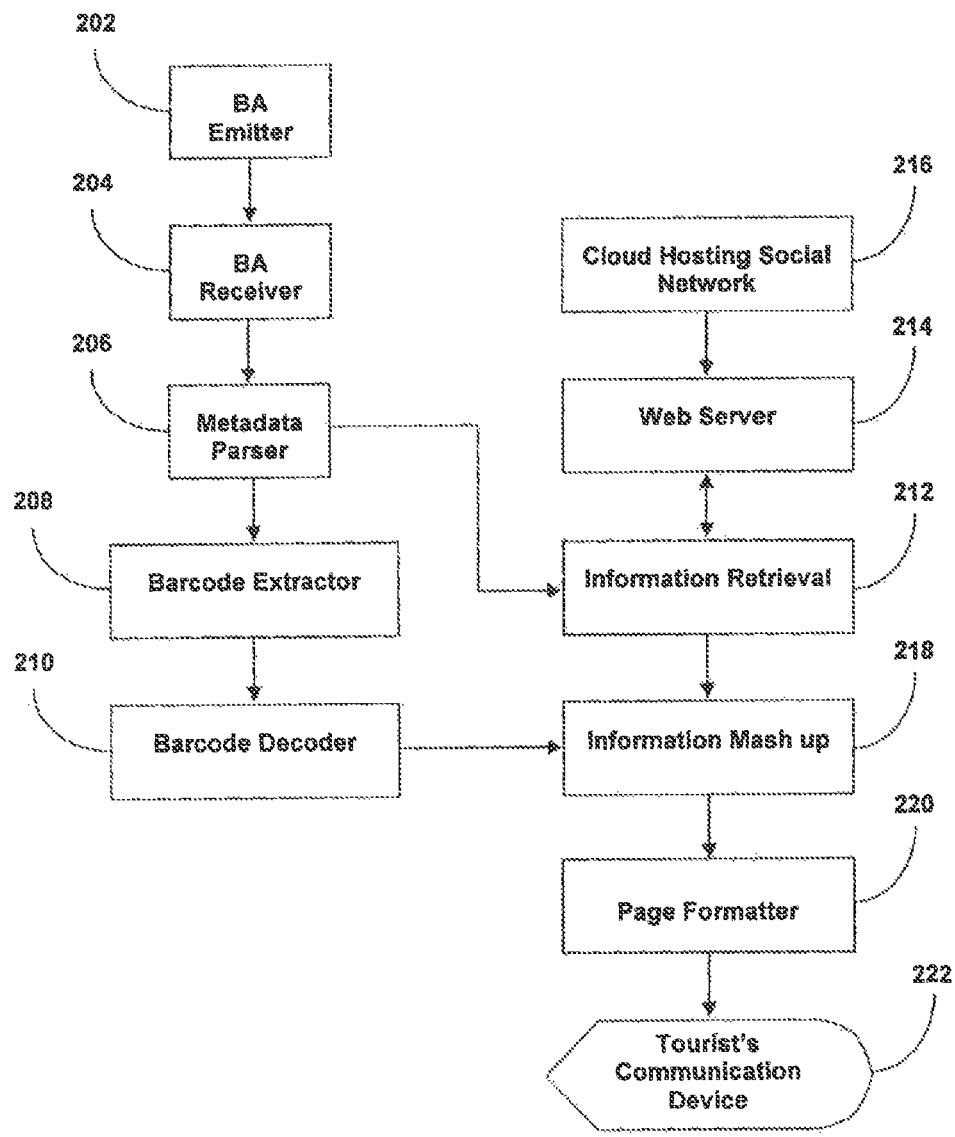
FIG. 2 shows block diagram illustrating the process for providing tourist assistance and guided navigation of a tourist spot by transmitting metadata across a communication network over a beyond audible frequency signal.

Referring to the FIG. 2 is a block diagram illustrating the process for providing tourist assistance and guided navigation of a tourist spot by transmitting metadata across a communication network over a beyond audible frequency signal.

In an embodiment of the invention, a method and system is provided for providing tourist assistance and guided navigation of a tourist spot by transmitting metadata across a communication network over a beyond audible frequency signal, wherein the system comprises of a beyond audible frequency signal emitter BA Emitter (202), a beyond audible frequency signal receiver BA Receiver (204), a Metadata Parser (206), a Barcode Extractor (208), a Barcode Decoder (210), an Information Retrieval (212) module, a Web Server (214), a Cloud Hosting Social Network (216), an Information Mash up (218) module, a Page Formatter (220) and a tourist's Communication Device (222).

In an embodiment of the invention, a method and system is provided for providing tourist assistance and guided navigation of a tourist spot by transmitting metadata across a communication network over a beyond audible frequency signal, wherein the beyond audible frequency signal emitters BA Emitter (202) are placed inside the tourist spot for providing tourist assistance and guided navigation. The tourist spot may include the tourist attractions, conference venue, museum, art pieces, forts or amusement parks. The BA Emitter (202) placed inside tourist spot for emitting information related to indoor location coordinates. The beyond audible frequency signals containing encoded metadata are emitted by the BA Emitter (202). The metadata may include additional geographical information related to the said place such as place name, historical data of the tourist spot, geographical information of the place etc. The metadata is encoded in the beyond human audible range, typically above 16 KHz and the upper range is limited by the imitation of the microphone or the speaker available in the device.

The emitted beyond audible frequency signals containing encoded metadata are received by the BA Receiver (204) of a tourist's personal communication device (222) such as a smart phone, a laptop, a tablet personal computer etc. The BA Receiver (204) of the tourist's personal communication device is a microphone sensor employed to receive beyond audible frequency signals containing encoded metadata. The BA Receiver (204) may also analyze the result and display "You are here" tag on the navigational map on tourist's personal communication device (222). There may be more than one BA Emitter (202) placed at one location, in the vicinity, the identification of BA Emitter (202) beacon is first established based on signal strength of the said BA Emitter (202). The received encoded metadata through beyond audible frequency signals are then parsed using the Metadata Parser (206). The Metadata Parser (206) separates the received encoded metadata from audible range signal in order to extract the normal data embedded as beyond audible metadata.

In an embodiment of the invention, the Barcode Extractor (208) is employed for extracting an encoded barcode received along with encoded metadata. The barcode bit stream may be the other kind of data which may be encoded within the metadata. The barcode is extracted from the incoming bit stream using the Barcode Extractor (208). The encoded barcode received along with encoded metadata is decoded to extract the embedded information using the Barcode Decoder (210). The incoming bit stream is fed to a standard Barcode Decoder (210) to extract the information embedded within the barcode. The embedded information of barcode may comprise a soft ticket, an entry pass, a coupon or promotional discounts etc. In addition the tourist may also receive useful alerts on weather, local news tickers; municipal announcements as a ubiquitous mechanism for G2C connect.

In an embodiment of the invention, the encoded metadata may contain the link to Web Server (214). The Web Server (214) may host various tourism related web services. The tourism related web services may include various discounts or coupons according to the tourist or tourist's interest. The Web Server (214) derives the tourist's interest using the Cloud Hosting Social Network (216). Thus the Information Retrieval (212) module utilizes the Web Server (214) and the Cloud Hosting Social Network (216) via the Web Server (214) for providing a tourist with tourism related web services based upon their interest. As an alternative Barcode Decoder (210) output may contain certain URL of webpage which can then be accessed from the web server (214).

The information retrieved from the Cloud Hosting Social Network (216) via the Web Server (214) and the information extracted and decoded from the barcode is mashed up using information Mash up (218) module. The Information Mash up (218) module aggregates the extracted normal data and data retrieved from barcode. The mashed up information is further rendered in text or html format along with the barcode image using Page Formatter (220). The rendered information is then displayed on tourist's Communication Device (222) such as a smart phone, a laptop, a tablet personal computer etc. The rendered information may be displayed multiple screens on the tourist's Communication Device (222). The rendered information may be played through the speakers of the tourist's Communication Device (222) depending on the audio nature of information. The tourism related web hyperlinks and retrieved information from various websites are further displayed on the tourist's Communication Device (222).

The retrieved information may included tourist's personal information related to travel such as itinerary etc. and additional information such as offers, discounts, queue-jump pass related to the tourist spot by accessing at least one web link received along with encoded metadata for plurality of web based services, tourist's personal information such as personal choices of the tourist about the area of interest, favorite cuisine etc. from social network of the tourist by the application running on tourist's Communication Device (222).

Additionally, the tourist is enabled to share their experience of various tourist spot, including the tourist attractions, conference venue, museum, art pieces, forts or amusement parks, via multimedia tags on the maps shown on the tourist's Communication Device (222). The tourist experience is shared among tourist's social network using Cloud Hosting Social Network (216) via the Web Server (214) for making comments, feedback on the content or rating the place.

Figure 3:
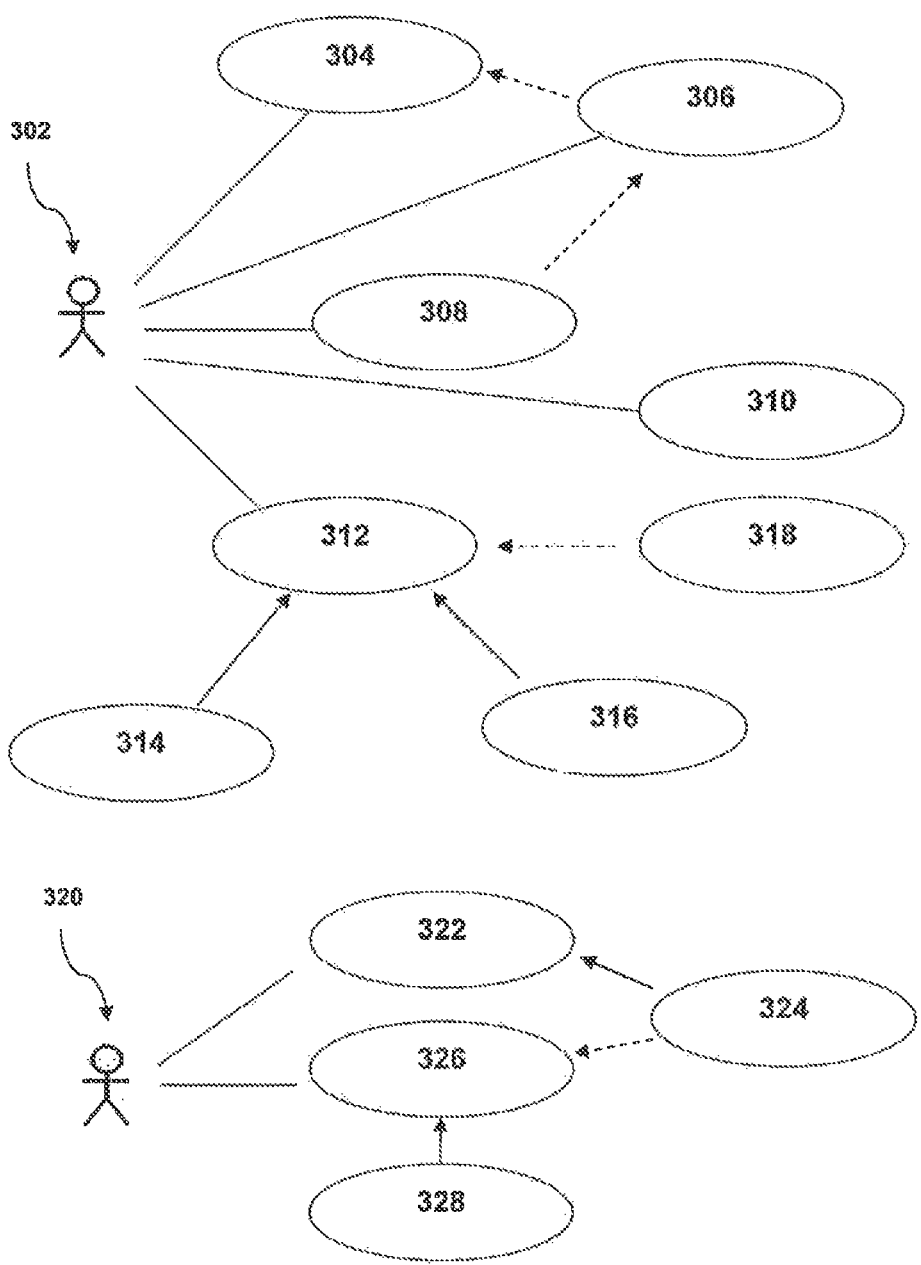
FIG. 3 shows block diagram illustrating Usecase of tourism application for providing tourist assistance and guided navigation of a tourist spot.

Referring to the FIG. 3 is a block diagram illustrating Usecase of tourism application for providing tourist assistance and guided navigation of a tourist spot.

In an embodiment of the invention, a typical usecases of this application, the tourist is provided with guidance in an indoor tourist venue such as a museum or an amusement park. The BA Emitter (202) is placed inside the museum or amusement park for emitting encoded metadata information related to a particular art piece of the museum or amusement park, such as its name and features. In addition it can also transmit a bar-coded link to an URL which will expose web services to get additional information such as brief history and navigational map of the said museum or amusement park. Additionally it can also provide freebies and offers like queue jump passer free ride pass by the authority of amusement park.

In an embodiment of the invention, a Tourist (302) signup for an account (304) using Communication Device (222) for further using a tourist application (320). The tourist (302) may Login (306), Logout (308) and Configure (310) the said tourist application (320). The tourist (302) may view tourist guidance (312) provided by the tourist application (320), access the information received from barcode (314) transmitted and extract the extra information from URL link from barcode (316). The tourist (302) may download and save the said information (318) on Communication Device (222) such as a smart phone, a laptop, a tablet personal computer etc.

In an embodiment of the invention, the Tourist application (320) invokes web service to get data from transmitted URL (322) once it receives URL of web server from barcode (324). The information embedded in the Barcode (326) is used to decode ultrasound encoded metadata (328).

Figure 4:
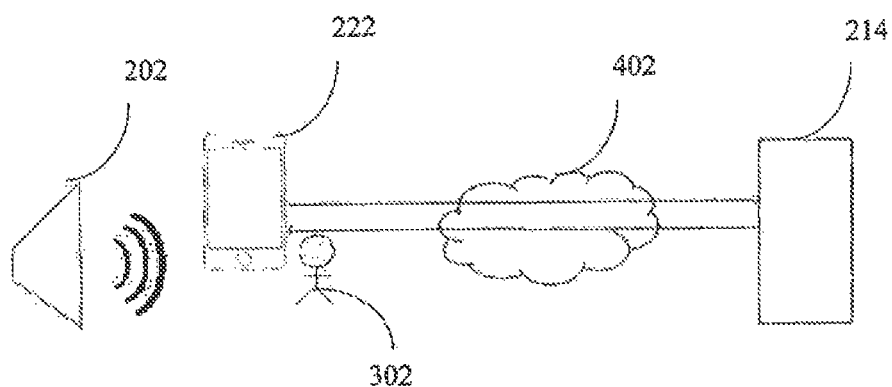
FIG. 4 shows block diagram illustrating the system deployment for providing tourist assistance and guided navigation of a tourist spot.

Referring to the FIG. 4 is a block diagram illustrating the system deployment for providing tourist assistance and guided navigation of a tourist spot.

In an embodiment of the invention, the BA Emitter (202) is continuously emitting encoded metadata over beyond audible frequency signal containing tourism related information about the tourist place. The tourist's Communication Device (222) is enabled to run the tourist application and receive the transmitted information using a beyond audible frequency signal receiver BA Receiver (204) present in the tourist's Communication Device (222) and decode and then render the same to the tourist. The metadata allows the tourist (302) to get more information about the said tourist place and nearby regions using the Web Server (214) via an Internet (402).

Moreover, the barcode embedded in the beyond audible frequency signal may also contain information about the URL of a website where more related information can be found.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal displays (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

Dedicated hardware implementations including, but not limited to, application specific integrated circuits, programmable logic arrays and other hardware devices can likewise be constructed to implement the methods described herein.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus the example system is applicable to software, firmware, and hardware implementations.

In accordance with various embodiments o the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle, spirit and scope.

We claim:

1. A computer-implemented method for providing tourist assistance and guided navigation of a tourist spot, via a metadata transmission across a communication network using beyond audible frequency signal and processing thereof, the method comprising:
    emitting an encoded metadata over the beyond audible frequency signal using a beyond audible frequency signal emitter;
    receiving the said emitted beyond audible frequency signal along with the said encoded metadata on a tourist communication device using a beyond audible frequency signal receiver;
    parsing the said received encoded metadata using metadata parser;
    extracting at least one barcode received along with encoded metadata using at least one barcode extractor and decoding the extracted barcode received along with encoded metadata using barcode decoder;
    retrieving the tourist information from the received metadata and barcode information, wherein the tourist information comprises of likes and dislikes of the tourist regarding an area of interest, cuisines and personal choices retrieved from social network of the tourist;
    retrieving the additional detailed tourist spot related information by accessing at least one web link received along with encoded metadata for plurality of web based services using at least one information retrieval system by accessing at least one cloud hosting social network through at least one web server;
    mashing up the retrieved tourist information with decoded barcode related information and the additional detailed tourist spot information using at least one information mash up system;
    rendering the mashed up information using at least one page formatter; and
    displaying the mashed up information on the tourist communication device using at least one tourist's communication device.

2. The method as claimed in claim 1, wherein the communication network further comprises at least one tourist's communication device which may be a smart phone, a laptop, or a tablet personal computer.

3. The method as claimed in claim 1, wherein the metadata comprises information regarding the tourist spot such as name of the tourist spot, points of interest, historical information of the tourist spot and geographical information.

4. The method as claimed in claim 1, wherein the beyond audible frequency signal is above 16 KHz and the upper range is limited by a microphone and at least one speaker available in the tourist's communication device.

5. The method as claimed in claim 1, wherein the beyond audible frequency signal is transmitted and received using the microphone available in the tourist's communication device.

6. The method as claimed in claim 1, further comprising the steps of:
- receiving the encoded barcode along with encoded metadata; and
- decoding the encoded barcode to extract the embedded information.

7. The method as claimed in claim 1, wherein the mashed up information is further rendered in text or html format along with the barcode image.

8. The method as claimed in claim 1, wherein the mashed up information is displayed on the tourist's communication device screen or audio played.

9. A system for providing tourist assistance and guided navigation of a tourist spot, based on a metadata transmission across a communication network using beyond audible frequency signal and processing thereof, the system comprising:
- at least one beyond audible frequency signal emitter adapted to emit beyond audible frequency signals containing encoded metadata;
- at least one beyond audible frequency signal receiver adapted to receive beyond audible frequency signals containing encoded metadata;
- at least one metadata parser adapted to parse the received beyond audible frequency signals containing encoded metadata;
- at least one barcode extractor adapted to extract an encoded barcode received along with encoded metadata;
- at least one barcode decoder adapted to decode the encoded barcode received along with encoded metadata;
- at least one information retrieval system adapted to retrieve information, wherein the information comprises of likes and dislikes of the tourist regarding an area of interest, cuisines and personal choices retrieved from social network of the tourist;
- at least one web server adapted to host plurality of web services;
- at least one cloud hosting social network containing the tourist's social interaction related information;
- at least one information mash up system adapted to mash up the extracted information from the metadata, the information related to the tourist's social interaction and information retrieved from the barcode, wherein the mashed up information is a customized set of information specific to the tourist communication device;
- at least one page formatter adapted to render the mashed up information; and
- at least one tourist's communication device having at least one display screen adapted to display the rendered mashed up information.

10. The system as claimed in claim 9, wherein the communication network comprises at least one tourist's communication device, which may be a smart phone, a laptop or a tablet personal computer.

11. The system as claimed in claim 9, wherein the tourist's communication device further comprises at least one microphone sensor, configured to sense, detect and receive the metadata emitted by beyond audible frequency signal emitter at beyond audible range frequency.

12. The system as claimed in claim 9, wherein the beyond audible range frequency is above 16 KHz and the upper range is limited by the microphone and at least one speaker available in the tourist's communication device.

* * * * *